Nov. 14, 1961  F. FAHNOE ET AL  3,008,987
CHLORINATION OF ORGANIC PHOSPHORUS COMPOUNDS
Filed June 16, 1954
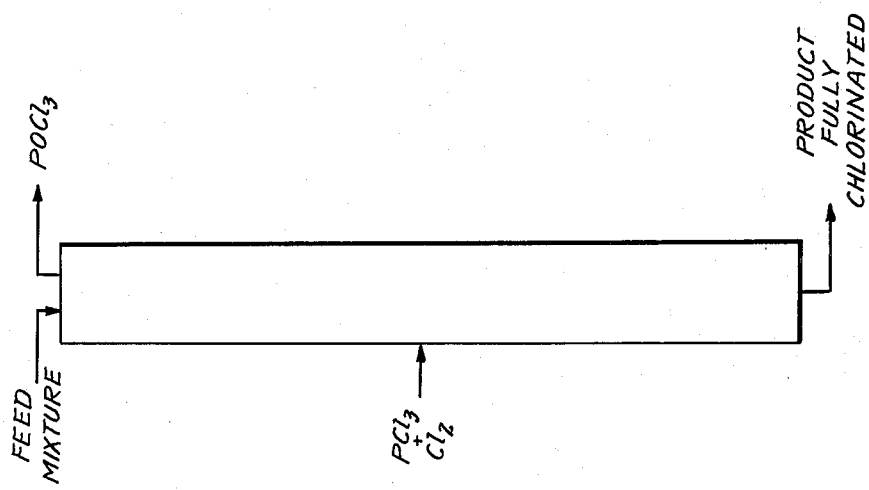
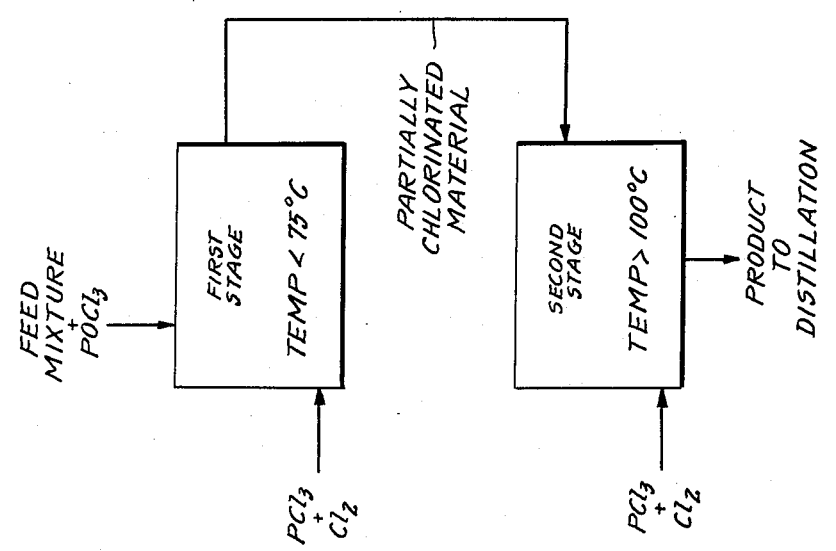
INVENTORS
FREDERICK FAHNOE
ARMANDO CERVI, JR.
BY
*Mitchell & Bechert*
ATTORNEYS

United States Patent Office 3,008,987
Patented Nov. 14, 1961

3,008,987
CHLORINATION OF ORGANIC PHOSPHORUS COMPOUNDS
Frederick Fahnoe, Morristown, N.J., and Armando Cervi, Jr., Philadelphia, Pa., assignors to Vitro Corporation of America, Verona, N.J.
Filed June 16, 1954, Ser. No. 437,088
4 Claims. (Cl. 260—543)

This invention relates to a process for the chlorination of organic phosphorous compounds and particularly to mixtures of alkylated phosphorus acids containing pyrophosphoric acid compounds.

In the preparation of organic phosphorus chlorides, it is often necessary to chlorinate mixtures of esters which will contain mono-, di-, and tri-esters of phosphoric acid as well as phosphoric acid. Reaction conditions are such that polymerizations of phosphoric acid compounds can occur with the formation of gels which are unreactive to chlorination and hence represent lost product. That is, components of a mixture of phosphoric and pyrophosphoric acids or esters thereof will be only incompletely chlorinated with mild chlorinating agents such as phosgene, thionyl chloride and the like. At atmospheric pressures, where elevated temperatures are likely to induce higher degrees of chlorination, dehydration reactions of the phosphoric acid and pyrophosphoric acid compounds set in and polymers are formed. Phosphorus pentachloride and phosphorus tri-chloride mixed with chlorine are useful chlorinating agents and would lead to an improved yield, but inasmuch as their rate of reaction is such that relatively high reaction temperatures are obtained, the conditions induce polymerization. It is, accordingly, a basic object of the invention to provide a method of chlorinating organic phosphorus compounds using phosphorus pentachloride or equimolar amounts of phosphorus trichloride and chlorine at conditions such that the polymerization reactions are avoided.

It is still another object of the invention to provide a method which will effect complete chlorination of mixtures of organic phosphorus compounds in an operation which accomplishes separation of the chlorinated product from the chlorinating agent at temperatures such that the rate of reaction is feasible for continuous operation.

Other objects and advantages of the invention will in part be obvious and will in part appear hereinafter.

The invention, accordingly, is embodied in a chlorination operation for producing a fully chlorinated product from organic phosphorus compounds including phosphoric and pyrophosphoric acid compounds, which comprises first subjecting the mixture of organic phosphorus compounds to a partial chlorination at a relatively low temperature in the presence of phosphorus oxychloride and subsequently completing the chlorination of the partially chlorinated material by reaction thereof with phosphorus trichloride and chlorine or phosphorus pentachloride as chlorinating agents. Preferably this latter stage of chlorination is carried out continuously in a reaction zone maintained substantially at adiabatic conditions at a temperature gradient in the range of about 105°–175° C., the limits thereof corresponding to the boiling temperature of phosphorus oxychloride and sublimation and dissociation temperature of phosphorus pentachloride at reaction pressures, and simultaneously removing from said reaction zone the chlorinated product and excess chlorinating agent.

In the drawing, the diagrams constituting FIGURES 1 and 2 are essentially flow diagrams of the process.

The operation is based in part upon the discovery that the mixture of organic phosphorus compounds, for example phosphoric acid and its mono- and di-esters can be solubilized in phosphorus oxychloride with substantially complete avoidance of dehydration of the compounds.

A typical mixture of organic phosphorus compounds is that obtained by pyrolysis of esters of phosphoric acid. These esters are obtained by reaction of a suitable alcohol with phosphorus trichloride. With methyl alcohol the usual ester obtained is dimethyl hydrogen phosphite, $(CH_3O)_2POH$, which pyrolyzes to a mixture which can be represented by the following:

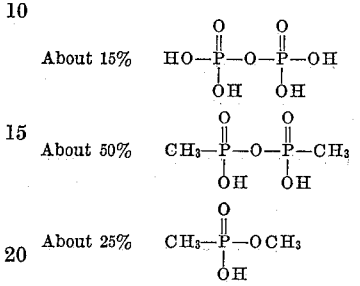

About 15%    $HO-\overset{O}{\underset{OH}{P}}-O-\overset{O}{\underset{OH}{P}}-OH$ About 50%    $CH_3-\overset{O}{\underset{OH}{P}}-O-\overset{O}{\underset{OH}{P}}-CH_3$ About 25%    $CH_3-\overset{O}{\underset{OH}{P}}-OCH_3$ Up to 10%    $(CH_3)_nPCl$ and other phosphorus compounds The materials are listed in the order of ease of chlorination. Stated generally, therefore, it may be said that the ease of chlorination is inversely proportioned to the degree of alkylation of the phosphoric acid compound. Since the objective is to obtain a product which is rich in alkyl groups and chlorine, the composition as it stands is in highly unfavorable form, for it will consume substantial amounts of chlorine before useful alkyl-chlorinated compounds are formed.

A mixture of substantially the stated composition requires about 138 grams of chlorine (1.83 moles) per 100 grams for full chlorination.

Conversion of this mixture to fully chlorinated material involves producing the dichloride of the methylated phosphorus as follows:

$$\text{Mixture} + PCl_3 + Cl_2 \rightarrow CH_3POCl_2 + POCl_3 + HCl$$

and in carrying out the reaction, dehydration must be avoided insofar as possible in order to avoid loss of phosphorus.

The starting mixture of phosphorus compounds is an oily, colorless, involatile, viscous liquid, specific gravity about 1.39, generally found to contain about 32 percent total phosphorus. It has no definite melting or boiling point. Similar mixtures are obtained with ethyl and propyl groups, i.e., as reaction products of ethyl and propyl alcohols with phosphorus trichloride.

Generally any dehydration which occurs in the process in accordance with this invention will not exceed more than 1–2 percent so that a homogeneous fluid reaction mass can be obtained by treatment of the mixture with phosphorus oxychloride. The material constituting the mixture of phosphorus compounds so treated is not dehydrated by phosphorus oxychloride at temperatures below about 62° C. At more elevated temperatures phosphorus oxychloride rapidly polymerizes the reaction mixture by dehydration. $PCl_5$ is very soluble in the phosphorus oxychloride reagent over the entire temperature range. Hence the operation involves maintaining in the reaction zone an appreciable quantity of phosphorus oxychloride, which functions as a diluent to avoid polymerization and gel formation, and operating the reaction at temperatures below 62° C. Since the reactants and final product of the reaction are miscible with the phosphorus oxychloride, a homogeneous liquid phase reaction mixture is maintained throughout the operation. For optimum operations in chlorinating these kinds of mixtures of organic phosphorus compounds, partial chlorination in the presence of phosphorus oxychloride at relatively low temperatures, below about 80° C., e.g. below about 75° C., and preferably below 60° C., should be accomplished and carried to the extent of about one-third of the theoretical chlorine absorption capacity, whereupon the chlorination is completed at substantially higher temperatures of the order of 150°–175° C. without gel formation. The level of preliminary chlorination is related to the methyl phosphoric acids and is approximately the same for ethyl and isopropyl compounds. Apparently the mechanism is that the preliminary chlorination eliminates the unsubstituted pyrophosphoric acid in the mixture, which is the principal ingredient responsible for its gel-forming capacity.

In the preferred method of operation the first stage or low temperature partial chlorination is carried out and the product thereof is then brought to a second stage or continuous operation conducted in a reaction zone, preferably in a form of a tower which takes advantage of the dissociation pressure of phosphorus pentachloride so as to provide in the zone an excess of appropriate chlorinating agent. By so operating, there is obtained as a bottoms product from such a reaction zone the desired chloride without contamination by phosphorus pentachloride. The process of so carrying out a chlorination reaction to make acid chlorides is set forth in our co-pending application Serial No. 437,087, filed on even date herewith, now abandoned.

The two-stage chlorination of a mixture of alkyl phosphoric acid compounds in a mixture like that described is carried out as indicated in FIGURE 1. The alkyl phosphoric acid material is maintained in a kettle, jacketed, agitated and provided with reflux. Temperature is held at 50°–60° C. About 30–40 percent of the required $PCl_3+Cl_2$ is fed into the mixture, under the surface and the rate of feed with additional mixture adjusted to provide about two minutes holdup.

Partially chlorinated material, i.e., about 35 percent chlorinated, is fed to the second high temperature stage, which may also be a kettle reactor, where temperature may be allowed to go as high as 175° C. without danger of loss of product. Generally, equilibrium is reached in a few minutes when partially chlorinated material and $PCl_5$ are fed in at appropriate rates, of which the following are typical:

14 lb./hr. of partially chlorinated alkyl phosphoric acid—30 percent chlorinated.
4–5 lb./hr. of $PCl_3$—i.e., about 5 percent excess.
2.3–2.4 lb./hr. of $Cl_2$—ie., about 2 percent excess.

Generally the reaction is self-sustaining, in the sense that its own heat will keep the reaction mass heated to optimum reaction temperature. However, if the feed of partially chlorinated material is diluted too far with $POCl_3$, heat of reaction may not maintain substantially adiabatic conditions.

As a specific example of the chlorination process the following is typical:

*Example*

In a reaction vessel kept at a temperature below about 60° C., 100 parts of a phosphorus compound mixture of the composition described is added to a vessel together with 100–200 parts of $POCl_3$ and to this is added 47 parts of $PCl_3+Cl_2$, representing about 35 percent of the necessary amount of $PCl_5$ to accomplish full chlorination. Reaction is practically instantaneous and the rate of addition of the $PCl_5$ is balanced with the cooling capacity of the vessel to keep the temperature below about 60° C.

This partially chlorinated material retains its fluid condition and is then passed into a second reaction zone kept at a temperature of about 160° C. with continuous addition of $PCl_3+Cl_2$, equivalent to $PCl_5$. As a vessel in this stage there may be used an ordinary closed kettle equipped with appropriate inlets for reagents and outlets for products of the reaction. Because the reactant $PCl_5$ is extremely corrosive, use of silver, glass, or polyfluorethylene linings is dictated.

The product so obtained corresponds to the dichlorinated material and is purified by flash distillation. Yields are substantially quantitative in that no real loss of starting material as polymerized gel occurs.

To conduct the continuous high temperature reaction and to produce the desired acid chloride from the partially chlorinated starting material, a mixture of methylated phosphoric acid containing as much as 50 percent phosphorus oxychloride is fed to the reaction zone counter-currently to a phosphorus trichloride vapor and chlorine mixture maintained substantially in the proportions to represent phosphorus pentachloride in slight excess. The column is sufficiently long and rates of feed are adjusted so that a reaction time sufficient for full chlorination is allowed. Preferred residence time of reactant in the tower is related to the temperature gradient and where that is from about 105° C. at the top to 175° C. at the point of introduction of chlorinating agent, a ten second interval is adequate. Reaction of the methylated phosphoric acid with the chlorinating agent is substantially instantaneous so that conditions in the tower can be kept essentially adiabatic where the peak temperatures of about 150°–165° C. are obtained, depending upon the proportions of phosphorus oxychloride in the feed.

As shown in the diagram, FIGURE 2, the phosphorus trichloride vapor and chlorine are introduced at low velocity and at a low point in the tower so that the vapor is maintained in a streamlined flow condition. Downflowing liquid washes the chlorine inlet point so that it is kept free of deposit of phosphorus pentachloride and flow conditions are readily balanced so as to produce substantially quantitative yields of the desired chlorinated product.

A stripping section of about two effective stages below the phosphorus trichloride inlet strips the downflowing liquid of phosphorus pentachloride and yields a bottom product of the desired acid chloride together with the excess $PCl_3$. The overhead product, phosphorus oxychloride is saturated with hydrogen chloride and alkyl chloride and is condensed in a suitable condenser and stripped before it is recycled into the operation. Any excess chlorine appears in the overhead.

Automatic process control of variables in the reaction may be achieved by using observations of temperature through the tower based on placement of temperature indicating devices through the height of the tower. With a fixed feed rate, the chlorine and phosphorus trichloride flow may be controlled from a temperature indicator located a short distance above the chlorine inlet. The amount of excess phosphorus trichloride added to the tower is regulated in accordance with the boiler temperature and the liquid levels in the reboiler control the product take off and addition of heat to the reboiler.

What is claimed is:
1. In a method of chlorinating mixtures of alkylated phosphoric acid compounds comprising lower alkyl esters of phosphoric acid, the steps which comprise partially chlorinating said mixture with a chlorinating agent comprising phosphorus chloride in the presence of phosphorus oxychloride at a temperature below 75° C. to chlorinate polymerizable fractions thereof, and thereafter reacting said partially chlorinated mixture at temperatures above 75° C. in the liquid phase with additional said chlorinating agent.

2. In a method of chlorinating a mixture of methylated phosphoric acids corresponding to a pyrolyzed reaction product of methyl alcohol and phosphorus trichloride the steps which comprise blending said mixture with phosphorus oxychloride, partially chlorinating said blended mixture with phosphorus pentachloride at a temperature below about 75° C. and thereafter fully reacting said partially chlorinated mixture in the liquid phase with phosphorus pentachloride at a temperature above 100° C.

3. The method of claim 2 wherein the mixture of methyl phosphoric acids is blended with substantially equal parts of phosphorus oxychloride and is chlorinated to about one-third of its capacity at a temperature below 75° C.

4. The process in accordance with claim 2 wherein the partially chlorinated mixture is reacted continuously with phosphorus pentachloride in a reaction zone maintained under substantially adiabatic conditions.

References Cited in the file of this patent

UNITED STATES PATENTS

| | | |
|---|---|---|
| 2,382,309 | Hamilton | Aug. 14, 1945 |
| 2,460,043 | Teeters | Jan. 25, 1949 |
| 2,685,603 | Walsh | Aug. 3, 1954 |

OTHER REFERENCES

Kosolapoff: Organophosphorus Compounds, John Wiley & Sons, New York, 1950, pp. 61–62.